United States Patent [19]
Hutchinson

[11] 3,808,452
[45] Apr. 30, 1974

[54] POWER SUPPLY SYSTEM HAVING REDUNDANT D. C. POWER SUPPLIES

[75] Inventor: Homer F. Hutchinson, Wheaton, Ill.

[73] Assignee: GTE Automatic Electric Laboratories Incorporated, Northlake, Ill.

[22] Filed: June 4, 1973

[21] Appl. No.: 367,065

[52] U.S. Cl. ............................................. 307/64
[51] Int. Cl. ........................................... H02j 9/00
[58] Field of Search ............ 307/64, 65, 66, 43, 80, 307/81, 85, 86, 87

[56] References Cited
UNITED STATES PATENTS
3,662,182  5/1972  Ullmann et al. ............... 307/64
3,293,446  12/1966  Baude ............................ 307/64

Primary Examiner—Herman Hohauser
Attorney, Agent, or Firm—L. N. Arnold

[57] ABSTRACT

A power supply system is disclosed wherein redundant d.c. power supplies are provided for a single load, each of the supplies being capable of providing full load current so that one of the power supplies may be removed without interrupting power to the load if it is defective. Each of the power supplies has remote sensing conductors extending to the load in addition to the current carrying conductors. Accidental opening of either the current carrying or remote sensing conductors is protected by rectifier diodes. Over-voltage protection in combination with the rectifier diodes also effectively isolates each of the power supplies from the load in the event one of the power supplies becomes defective and enables the removal without interrupting the operation of the other.

14 Claims, 1 Drawing Figure

PATENTED APR 30 1974 3,808,452
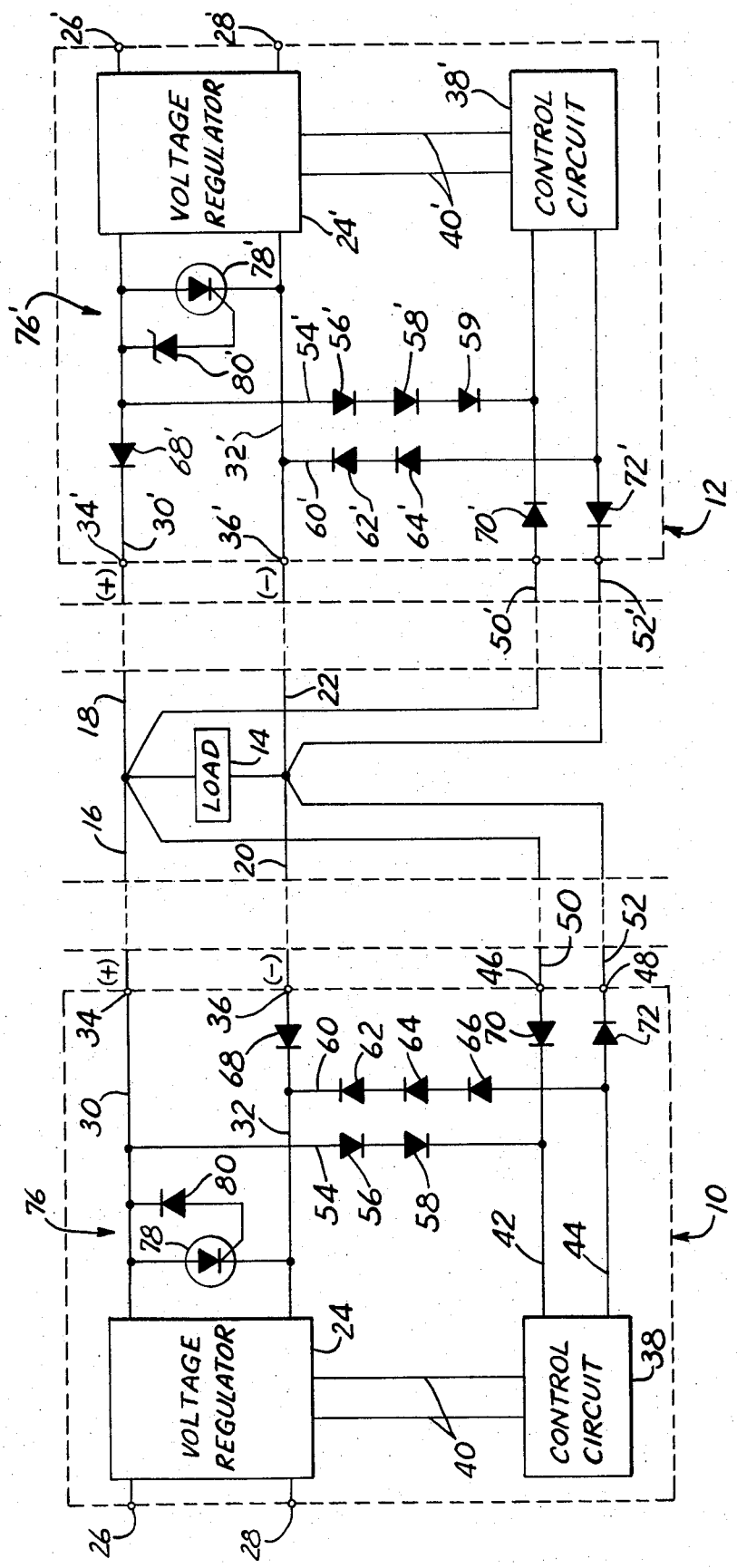

POWER SUPPLY SYSTEM HAVING REDUNDANT D. C. POWER SUPPLIES

The present invention generally relates to a d.c. power supply system and, more particularly, to two or more d.c. power supplies which are connected to a single load to insure continuation of power to the load in the event one of the power supplies becomes inoperative.

While it is well known that multiple power supplies within a system may be connected together in parallel to increase the total output current of the power supply system in the event a single power supply would be incapable of supplying the requisite load current for a system in which it is incorporated, such parallel connected power supplies are typically not constructed so that an individual power supply may be removed without interrupting the power supplied to the load. Additionally, a system in which multiple parallel connected supplies are incorporated may require operation of all of the individual units to supply the necessary load current for the system, and if one of the power supplies becomes inoperative due to component failure or the like, the total load current may be inadequate. However, if the remaining power supplies are marginally capable of providing the required load current for the system, the increased load on the remaining supplies may result in overheating or failure of these remaining power supplies.

In an overall system which requires a continouous supply of power because of the importance of continued service as, for example, in portions of a telephone system, or where the equipment being supplied is of such high cost that complete redundancy of the entire equipment is economically unfeasible, the use of redundant power supplies may be quite practical. However, in the event two or more power supplies are connected to a common load and one of the power supplies becomes inoperative, the advantage of having the second power supply would be severely diminished if the overall system was reuired to be shut down while the inoperative power supply was disconnected and replaced or repaired.

Accordingly, it is a primary object of the present invention to provide an improved power supply system which includes two or more power supplies connected to a common load wherein each is capable of providing the necessary power requirements and wherein power is continuously provided to the load even though one of the supplies becomes inoperative and is removed from the power supply system.

Other objects and advantages will become apparent upon reading the following detailed description, while referring to the attached drawing which is an electrical schematic diagram illustrating a redundant power supply system embodying the present invention.

Broadly stated, and referring to the drawing, there is shown two power supplies 10 and 12, indicated generally within the dotted lines, each of which is connected to a common load 14 through respective high potential load conductors 16 and 18 and low potential load conductors, 20 and 22. Thus, each of the power supplies 10, 12 is adapted to supply full load power to the load 14, and provide uninterrupted service even if one of the power supplies becomes inoperative.

Each of the power supplies 10 and 12 is similarly constructed and, accordingly, power supply 10 is described in greater detail herein, with substantially similar components in power supply 12 being given the same numbers with prime designators. In accordance with an aspect of the present invention, the power supply 10 includes a d.c. voltage regulator 24 having input terminals 26 and 28 into which a d.c. input is supplied by a source (not shown). The voltage regulator 24 has high and low potential output load leads 30 and 32 and terminals 34 and 36 to which the load conductors 16 and 20 are connected, respectively. Thus, the d.c. high potential is applied to the loan 14 through output load lead 30 and load conductor 16 with the low potential being defined by load conductor 20 and load lead 32. A feedback control circuit 38 is provided and has interconnections 40 for controlling the voltage regulator 24 and also has respective high and low potential sensing leads 42 and 44 extending to the load 14 through terminals 46 and 48 and remote sense conductors 50 and 52. Thus, the voltage applied at the load is monitored or sensed through the sense leads and conductors. The high potential load lead 30 is also interconnected with high potential sense lead 42 by an interconnecting lead which includes two diodes 56 and 58 connected in series and positioned so that they are forward biased in the same direction for conducting current from the load lead 30 to the sense lead 42. Similarly, the low potential load lead 32 and low potential sense lead 44 are interconnected by lead 60 which has diodes 62, 64, 66 series connected therein and forward biased in the direction to conduct current from the sense lead 44 to the load lead 32. A diode 68 is positioned in the low potential load lead 32 with the anode effectively connected to the load 14. Additionally, diodes 70 and 72 are connected in respective sense leads 42 and 44, with the anode of diode 70 connected to the high potential side of the load 14 and the cathode of diode 72 is connected to the low potential side of the load.

It should be understood that as the load varies, current through the load conductors varies and the voltage drop across the regulator terminals 34, 36, as well as across the load itself varies in a similar manner due to inherent conductor resistance. To compensate for the voltage drop in the load conductors 16 and 20, the sensing conductors 50 and 52 are provided and are connected across the load to the sense lead terminals 46 and 48. In the event the conductors 16, 20, 50, and 52 are of sufficient length that the voltage drop through them is greater than the voltage drop through the diodes located in the interconnecting conductors 54 and 60, current will flow through the interconnecting conductors rather than through the conductors extending to the load 14. More specifically, if the voltage drop through the high potential interconnecting lead 54 and the diodes 56 and 58 is less than through the path defined by the load lead 16, sense lead 50 and diode 70, current will flow through the conductor 54 to the control circuit rather than through the conductors 16 and 50. Similarly, the interconnecting lead 60 with its diodes 62, 64 and 66 will conduct current if the voltage drop therethrough is less than through the path defined by the diode 72, sense conductor 52, load conductor 20, and diode 68. Since the voltage drop across a conducting silicon rectifier diode is approximately 0.7 volts (a germanium diode being slightly less, i.e., 0.2–0.5 volts), it should be understood that if the inherent voltage drop in the conductors extending to the load is minimal, current will normally pass therethrough rather than through the interconnecting leads 54 and 60. Thus, the rectifier diodes 56, 58, 62, 64 and 66 are included to provide an increased voltage drop, while the diodes 68, 70, and 72 are provided for isolation and protection of the power supply 10 as well as the load in the event some fault or disconnection of one of the conductors occurs. The low potential interconnecting lead 60 contains three diodes because the current path defined by sense lead 44, sense conductor 52, load conductor 20, and load lead 32 contains two diodes, namely, diodes 68 and 72. Thus, the third diode is required to increase the voltage drop through the interconnecting lead 60 so that the voltage drop is normally lower through the loop including the sense conductor 52 and load conductor 20. Current will then flow through the conductors as is desired, rather than the interconnecting lead 60. The interconnecting lead thus defines an alternate current path for the control circuit and is only operative if the length of the conductors is sufficiently great that the voltage drop is greater than through the interconnecting lead, or if one of the conductors becomes open circuited. Similarly, the high potential interconnecting lead 54 includes two diodes 56 and 58 so that the voltage drop in this interconnecting lead is normally greater than the voltage drop through the load lead 16, sense lead 50 and diode 70, assuming that the inherent voltage drop in the conductors 16 and 50 is not appreciably great.

In accordance with another aspect of the present invention, and as previously described, the load current is applied to the load 14 through the high and low potential load leads and conductors and, accordingly, the diode 68 must be capable of conducting the full load current during operation. Thus, it is normally forward biased when power is being supplied to the load and its function is to isolate power supply 10 from the load 14 in the event the power supply should fail or become inoperative, in which case the diode 68 would no longer be foward biased. If this occurs, power supply 12 would take over the full load requirements and maintain an interrupted supply of power to the load. The feedback control circuit 38, by means of the sense conductors connected to the load, monitors the voltage across the load 14 and provides signals through leads 40 to the voltage regulator to maintain the voltage applied at the load within predetermined limits. Diode 70 protects the remote sensing conductors 50 in the event of an open circuit between the high potential load terminal 34 and the load 14. If the load lead 16 connected to the terminal 34 is open circuited, full load current will be precluded from flowing through interconnecting lead 54 and thereafter through high potential sensing conductors 50 to the load, since diode 70 will be reverse biased and will block current flow through this path. Similarly, diode 72 protects remote sensing conductor 52 in the event of an open circuit in the low potential load conductor 20, as diode 72 will be reverse biased, which would preclude full load current being conducted from the negative side of the load through the low potential sense conductor 52 and interconnecting lead 60. Thus, diodes 70 and 72 protect the remote sense conductors from carrying full load current in the event either of the load conductors 16, 20 are open circuited due to disconnection at the load terminals 34, 36 or the like. Additionally, if either of the sense conductors 50 or 52 becomes open circuited for any reason, the interconnecting leads 54 and 60 will provide an alternate current path for the control circuit 38 and will prevent the control circuit from providing an incorrect feedback signal to the voltage regulator which could cause it to greatly change the output voltage supplied to the load 14.

To protect the load 14 in the event of an over-voltage output condition of the voltage regulator, an overvoltage crowbar circuit, indicated generally at 76, is provided and includes a thyristor means, such as the illustrated silicon controlled rectifier (SCR) 78 having its anode connected to the high potential load lead 30 and its cathode connected to the low potential load lead 32, with the control lead connected to the high potential load lead 30 via a reference diode 80. In the event the output voltage exceeds a predetermined value, the reference diode 80 will be biased into conduction and conduct the current to the control terminal to trigger SCR 78 into conduction which effectively clamps the value of the output potential to a low value.

The location of the crowbar circuit 76 with respect to the diode 68 located in the low potential load lead is important and, in this connection, the cathode of SCR 78 is connected to the cathode of diode 68 so that when SCR 78 is triggered, diode 68 becomes reverse-biased to isolate the power supply 10 from the load.

A slight modification which also embodies the present invention is shown with respect to power supply 12, wherein isolating diode 68' is connected in the high potential load lead 30' rather than in the low potential load lead as was the case with respect to power supply 10. When the diode 68' is connected in lead 30', a third diode 59 is added to lead 54' and lead 60' is changed to include only two diodes 62' and 64'. This is different from leads 54 and 60 in power supply 10 which include two and three diodes respectively. In this embodiment, interconnecting lead 60 defines an alternate current path for the control circuit and is only operative if the length of the conductors 22 and 52' is sufficiently great that the voltage drop through these conductors and through diodes 72' is greater than the voltage drop through the interconnecting lead having its two diodes 62' and 64'. Similarly, since high potential lead 30' contains diode 68', the path through lead 30', conductors 18 and 50' and lead 42' contains two diodes, namely, diodes 68' and 70', and, therefore, interconnecting lead 54' contains three diodes, i.e., diodes 54', 56' and 59, so that this interconnecting lead normally has a higher voltage drop than through the conductors 22 and 50'. The power supply 12 is also isolated from the load if the overvoltage protection crowbar circuit is activated since the anode of diode 68' is connected to the anode of SCR 78'. Thus, triggering of SCR 78' will lower the voltage level on 30' to a low value and will reverse bias diode 68' to effectively isolate power supply 12 from the load. It should therefore be understood that both of the power supplies may be constructed as shown and described with respect to the power supply 10 or the power supply 12.

To repair the inoperative power supply 10, (or power supply 12 as the case may be) the effective isolation of the inoperative power supply enables it to be easily physically removed from the load without interrupting power being supplied thereto by the other operating power supply. To remove the inoperative power supply, it is only necessary to disconnect the conductors from input terminals 26 and 28, the load terminals 34, 36 and the sense terminals 46, 48, and thereafter physically remove the power supply from the circuit. Another power supply may then be inserted to replace it or the inoperative power supply may be repaired and replaced.

To connect a repaired or replacement power supply, the procedure is to physically place it in the proper location and connect input conductors to the terminals 26 and 28 and connect the remote sense connectors 50 and 52 to the respective sense terminals 46 and 48 and then connect either of the load conductors to the proper load terminal 34 or 36. This leaves one of the load terminals open to allow the output of the voltage regulator 24 to be checked and adjusted against the output of voltage regulator 24' so that the voltage transient which will be created when the power supply is returned to the common load will be minimized. At that point, the remaining load conductor can be connected to the load terminal and both power supplies will then again be connected to the common load 14.

If desired, the power supplied from both power supplies can be equalized by comparing the voltage in low potential load lead 32 with the corresponding load lead 32' of the voltage regulator 24' and if the difference in the voltage levels is minimized, the two power supplies would be sharing current generally equally, provided the voltage drop across the rectifier diodes 68 and 68' are reasonably close.

Thus, the power supply system described herein provides a continuing, uninterrupted supply of power to a load even though one of the individual power supplies breaks down or becomes otherwise inoperative. The system permits the inoperative power supply to be physically removed and repaired or replaced without necessitating shutting down the complete power supply system. This is advantageous in the event the equipment being supplied is important in that severe repercussions may result if power is interrupted for some reason. Thus, in the illustrated embodiment, an overvoltage condition in the voltage regulator output will cause that power supply to shut down and simultaneously be electrically isolated from the load, enabling the other power supply to maintain power to the load. It is then possible to easily disconnect the inoperative power supply from the power supply system without requiring any shut down period, and damage to either the load or the power supply itself is substantially precluded.

It is of course understood that although a preferred embodiment of the present invention has been illustrated and described, there are modifications which will be apparent to those skilled in the art; and, accordingly, the scope of the present invention should be defined only by the appended claims and equivalents thereof.

Various features of the invention are set forth in the following claims.

What is claimed is:

1. A direct current potential regulated power supply system to which load and sensing conductors can be attached for connecting a load, comprising:
    first and second d.c. power supplies for parallel connection to the load;
    each of said supplies including voltage regulating means and high and low voltage load leads to which the load conductors can be attached for connecting the load;
    a control circuit for each of said supplies for sensing the load voltage and for regulating the load voltage of each of said supplies, including high and low voltage sensing leads to which the sensing conductors can be attached for connection to the load;
    a first rectifier diode connected in one of said load leads of each of said supplies so that the diode is biased into conduction when voltage is applied to the load through the load conductors;
    each of said sensing leads having a rectifier diode therein which is forward biased when power is supplied to the load;
    means interconnecting said high voltage load and sensing leads and having a greater voltage drop during conduction than through the high voltage load and sensing conductors;
    means interconnecting the lower voltage load and sensing leads and having a greater voltage drop during conduction than through the low voltage sensing and load conductors.

2. A direct current potential regulated power supply system as defined in claim 1, wherein each of said power supplies includes thyristor means having an anode connected to the high voltage load lead, a cathode connected to the low voltage load lead and a control terminal connected to the high voltage load lead through a reference diode, so that when the voltage level in said high voltage load lead of one of said supplies exceeds a predetermined value, said reference diode conducts current to trigger said thyristor means into conduction and said high voltage load lead is clamped to a low value and said first rectifier diode is reverse biased to thereby isolate said one power supply from said load.

3. A direct current potential regulated power supply as defined in claim 1, wherein said first rectifier diode is connected in said low voltage load lead of each of said power supplies.

4. A direct current potential regulated voltage supply system as defined in claim 3, wherein said means interconnecting said high voltage load and sensing leads includes a lead having at least two series connected rectifier diodes, all of which are forward biased towards said sensing lead.

5. A direct current potential regulated power supply system as defined in claim 3, wherein said means interconnecting said low voltage load and sensing leads includes a lead having at least three series connected diodes, all of said diodes being forward biased towards said load lead.

6. A direct current potential regulated power supply system as defined in claim 1, wherein said first rectifier diode is connected in said high voltage load lead of each of said power supplies.

7. A direct current potential regulated power supply system as defined in claim 6, wherein said means interconnecting the high voltage load and sensing leads includes a lead having at least three series connected rectifier diodes all of which are forward biased towards said sensing lead.

8. A direct current potential regulated power supply system as defined in claim 6, wherein said means conenecting said low voltage load and sensing leads includes a lead having at least two series connected diodes, all of said diodes being forward biased towards said load lead.

9. A direct current potential regulated power supply system to which load and sense conductors can be attached for connecting a load, the system having redundant capabilities, comprising:

first and second power supplies adapted to be connected in parallel to the load, each of the power supplies being capable of supplying substantially the full load power requirements, thereby enabling physical removal of one of the power supplies for repair or replacement without interruption of power supplied to the load in the event said one power supply becomes inoperative or the like, each of the first and second power supplies comprising:

voltage regulating means having high and low voltage load leads to which the load conductors can extend and connect to the load;

control circuit means including high and low voltage sense leads to which the sense conductors can extend and connect to the load, said control circuit means being adapted to monitor the voltage applied to the load and vary the voltage regulating means to maintain a generally constant load voltage;

a first rectifier diode connected in one of the load leads so that said diode conducts when power is supplied to the load;

a second rectifier diode in the high voltage sense lead with the anode connected to the load through the high voltage sense conductor;

a third rectifier diode in the low potential sense lead with the cathode connected to the load through the low voltage sense conductor;

means interconnecting said high voltage load and sense leads and having a normally greater voltage drop during conductor than through the high voltage load and sense conductors; and means interconnecting the low voltage load and sense leads and having a normally greater voltage drop during conduction than through the low voltage load and sense conductors.

10. A power supply system as defined in claim 9, wherein each of said power supplies includes thyristor means having an anode connected to the high voltage load lead and a cathode connected to the low voltage load lead and a control terminal connected to the high voltage load lead through a reference diode, so that when the voltage in said high potential load lead of one of said power supplies exceeds a predetermined value, said reference diode conducts current to trigger said thyristor means into conduction and said high voltage load lead is clamped to a low value and said first rectifier diode is reverse biased to thereby isolate said one power supply from said load.

11. A power supply system as defined in claim 9 wherein the disconnection of either of the load conductors from one of said power supplies from its load lead effectively isolates said power supply from the load and permits disconnection of all other conductors from their respective leads to facilitate removal of the power supply without interrupting the power supplied to the load.

12. A power supply system as defined in claim 9, wherein said first rectifier diode is connected in said low voltage load lead of at least one of said first and second power supplies.

13. A power supply system as defined in claim 12, wherein said means interconnecting the high voltage load and sense leads in each of said power supplies having said first rectifier diode in said low voltage load lead comprises a lead having at least two series connected rectifiers, all of which are forward biased to conduct current from said load lead to said sense lead.

14. A power supply system as defined in claim 12, wherein said means interconnecting the low potential load and sense leads in each of said power supplies having said first rectifier diode in said low voltage load lead comprises a lead having at least three rectifiers series connected therein, all of which are forward biased to conduct current from said sense lead to said load lead.

* * * * *